UNITED STATES PATENT OFFICE.

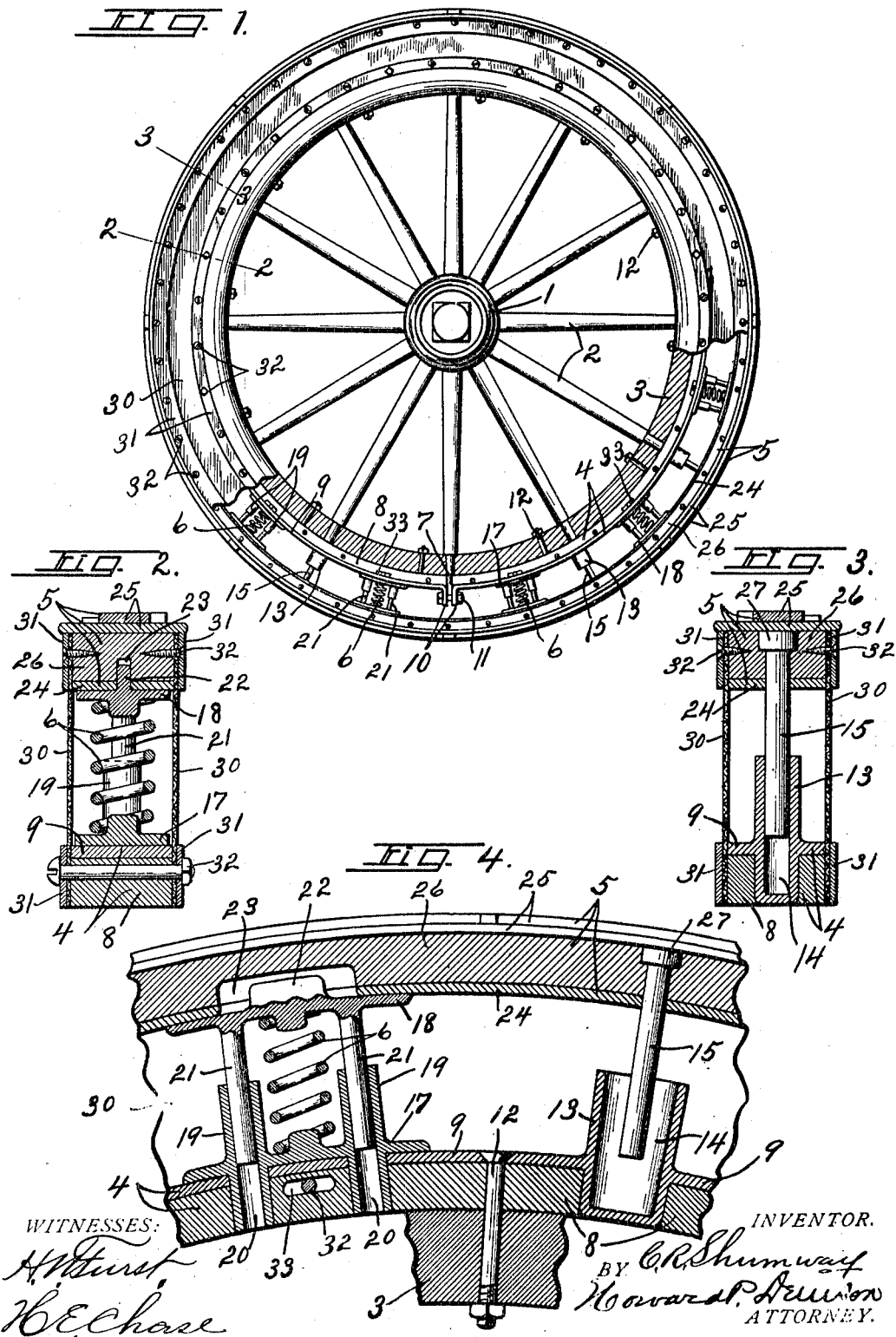

CYRUS R. SHUMWAY, OF HAYT CORNERS, NEW YORK, ASSIGNOR OF ONE-HALF TO ORVILLE W. BROWN, OF HAYT CORNERS, NEW YORK.

VEHICLE-WHEEL.

1,114,923.  Specification of Letters Patent.  Patented Oct. 27, 1914.

Application filed June 13, 1913. Serial No. 773,440.

*To all whom it may concern:*

Be it known that I, CYRUS R. SHUMWAY, of Hayt Corners, in the county of Seneca, in the State of New York, have invented new and useful Improvements in Vehicle-Wheels, of which the following, taken in connection with the accompanying drawings, is a full, clear, and exact description.

This invention relates to certain improvements in vehicle wheels and refers more particularly to a resilient tire as a substitute for the ordinary pneumatic tire.

The main object is to provide a simple, practical and efficient tire which may be manufactured at a minimum cost, is easily and quickly applied to the periphery of an ordinary rim or felly and possesses the desired resiliency without employing any pneumatics in its construction.

Another object is to provide for a limited relative circumferential movement of the tire rings to compensate for slight variations in radius of the tread portion of the wheel under load or when passing over obstructions and also to relieve the sudden jar upon the driven wheels when starting the machine and incidentally to utilize the springs between the rings for restoring them to their normal relation.

Another object is to provide simple means for holding the rings in the same plane transversely of the axis against relative lateral movement.

A still further object is to provide flexible dust guards connecting opposite sides of the tire rings to exclude dust and other foreign matter from the springs and sliding connections between the rings.

Other objects and uses will be brought out in the following description.

In the drawings—Figure 1 is an end view partly in section of a vehicle wheel embodying the various features of my invention. Figs. 2 and 3 are enlarged transverse sectional views through the rim and tire of the same wheel taken respectively on lines 2—2 and 3—3, Fig. 1. Fig. 4 is an enlarged longitudinal sectional view of a portion of the tire.

In order that my invention may be clearly understood, I have shown a hub —1— of a wheel having a series of radiating spokes —2— connecting it to a suitable rim or felly —3— upon which the tire, forming the subject matter of my present invention, is mounted. This tire comprises inner and outer concentric rings —4— and —5— spaced some distance apart and yieldingly held in this relation by a series of coil springs
—6— which are also spaced some distance apart circumferentially and are sufficiently stiff to maintain the concentric relation between the rings under a normal predetermined load which the vehicle, of which the wheels form a part, is adapted to carry. The inner ring is adapted to be clamped tightly upon the periphery of the rim or felly —3— and for this purpose is divided through one side at —7— with its meeting edges spaced a sufficient distance apart to permit to be drawn tightly or released at will when placing it upon or removing it from the rim or felly, said inner ring comprising an inner annulus —8— of wood or metal and an outer and relatively thinner metal band —9— fitting snugly upon the periphery of the annulus —8—.

The ends of the band —9— at the division —7— are preferably turned outwardly forming ears —10— which are apertured for receiving a clamping bolt —11— by which the ring —4— may be drawn tightly upon the periphery of the felly —3— to hold it against relative lateral or circumferential movement thereon but in practice I prefer to use additional bolts as —12— passing radially through the registering apertures in the ring —4— and felly for additionally locking these parts against relative circumferential or lateral movement under excessive strains.

The band —9— is provided with a series of radial bosses —13— extending inwardly and outwardly some distance beyond the main body of the band and provided with circumferentially elongated sockets —14— for receiving a corresponding number of radial studs —15— which are secured to and project inwardly from the outer ring —5— leaving sufficient clearance between the inner ends of the sockets and studs and also between the inner faces of the rim and outer ends of the bosses —13— to allow a limited radial action of the rings relatively to each other.

The rings —4— and —5— are yieldingly held in normal concentric relation by a series of coil springs —6— which are interposed between suitable bearing plates —17— and —18— resting respectively against the periphery of the band —9— and inner face of the ring —5—, the plates —17— being provided with a plurality of, in this instance two, radially projecting bosses —19— having radial sockets —20— for receiving corresponding pairs of studs —21— projecting inwardly from the plate —18— as shown more clearly in Fig. 4.

The bosses —19— extend inwardly and outwardly beyond the main body of the band —9—, the inwardly projecting portions being inserted through registering apertures in the annulus —8— and together with the similar inwardly projecting portions of the bosses —18— serve to hold the band —9— and annulus —8— against relative circumferential movement while the outwardly projecting portions of the bosses —19— terminate some distance from the inner face of the ring —5— so as to allow limited radial movement of both rings relatively to each other under load against the action of the springs —6—.

The plates —17— may be brazed or otherwise permanently secured to the periphery of the band —9—, but the outer plates —18— preferably rest loosely against the inner face of the ring —5— to allow circumferential sliding movement of the rings relatively to each other and, in order that the plates may be held against lateral movement, they are provided with radially projecting lugs —22— movable in circumferentially elongated slots —23— in the inner face of the ring —5—, the slots being of sufficiently greater length than the lugs —22— to allow the relatively circumferential movement referred to.

The outer ring —5— preferably comprises inner and outer metal bands —24— and —25— and an interposed annulus —26— of wood or metal, but of greater thickness than either of the bands so as to give rigidity to this part of the wheel. The outer band —25— serves as a tread or tire proper and is ribbed to prevent skidding and may be secured to the annulus —26— by any suitable fastening means as for example by shrinking it upon said annulus.

The studs —15— are preferably placed in operative position in the outer ring —5— before the band —25— is secured in position, the outer ends of said studs being enlarged to form heads —27— fitting in corresponding sockets in the outer face of the annulus —26— so as to allow the heads to abut against the inner face of the band —25— which serves to hold the studs against outward displacement.

The springs —6— are spaced uniform distance apart circumferentially of the tire and are preferably between the studs —21— of each pair with their outer ends encircling suitable bosses which serve to hold them against lateral displacement, said springs being of uniform tension capable of supporting a predetermined load and are intended more particularly to relieve the vehicle from sudden jolts or jars in passing over obstructions. In like manner, the studs —15— and —21— of each set are disposed uniform distances apart circumferentially and serve to hold the inner and outer rings against relative lateral movement and at the same time permitting free relative radial movement, the transverse width of the slots or sockets —14— being substantially equal to the diameter of the studs —15— for the purpose just described but are elongated circumferentially to allow the relative circumferential movement of said rings previously referred to. In like manner, and for the same purpose, the transverse width of the slots —23— are substantially equal to that of the lugs —22—.

In order to protect the springs and sockets or slots against accumulations of dust and other foreign matter, I have provided the tire with oppositely disposed flexible dust guards —30— of rubber or equivalent elastic material cut in circular form and having their inner and outer edges clamped by annular plates —31— and bolts —32— to corresponding sides of the rings —4— and —5— which together with the flexible webs —30— constitute a dust-proof housing for the springs —6— and guide studs —15— and —21—, the webs —30— being sufficiently elastic to allow relative radial movement of the rings —4— and —5— as previously described.

The clamping members —31— are circular and, therefore, continuous while the clamping bolts for the inner plates are passed through circumferentially elongated slots —33— in the annulus —8— to allow said annulus to be adjusted slightly on the felly when tightening and loosening the tire by means of the clamping bolt —11—.

What I claim is:

1. A tire comprising inner and outer concentric rings, plates secured to the inner ring and each provided with a pair of spaced sockets, the outer ring provided with longitudinally elongated openings, plates resting loosely against said outer ring and having lugs positioned in said openings to move circumferentially of said ring, said plates each provided with a pair of spaced studs projecting toward the inner ring and slidably positioned in the sockets in the plates secured to the inner ring, and a spring positioned between said plates intermediate the coacting sockets and studs.

2. A tire comprising inner and outer concentric rings, plates secured to the inner ring and each provided with a pair of spaced sockets, the outer ring provided with longitudinally elongated openings, plates resting loosely against said outer ring and having lugs positioned in said openings to move circumferentially of said ring, said plates each provided with a pair of spaced studs projecting toward the inner ring and slidably positioned in the sockets in the plates secured to the inner ring, a spring positioned between said plates intermediate the coacting sockets and studs, and additional sockets formed in the inner of said rings and elongated circumferentially of said ring, and studs extending inwardly from the outer ring and seated in said sockets and movable therein circumferentially of said ring.

In witness whereof I have hereunto set my hand this 29th day of May. 1913.

CYRUS R. SHUMWAY.

Witnesses:
CLARENCE OPDYKE,
ELNORA E. OPDYKE.

Copies of this patent may be obtained for five cents each, by addressing the "Commissioner of Patents, Washington, D. C."